United States Patent Office

2,750,426
Patented June 12, 1956

2,750,426

MANUFACTURE OF CUMYLPHENOL

Godfrey Paul Armstrong, Kingswood, Frederick James Bellringer, Coulsdon, Thomas Bewley, Epsom, England, Peter Lionel Bramwyche, Penarth, Wales, Geoffrey William Jackson, Southborough, and Frederick John Wilkins, Cheam, England, assignors, by mesne assignments, to Hercules Powder Company, a corporation of Delaware No Drawing. Application January 18, 1956,
Serial No. 559,784

Claims priority, application Great Britain June 8, 1949

1 Claim. (Cl. 260—619)

The present invention relates to improvements in the manufacture of phenol by the decomposition of isopropylbenzene peroxides into acetone and phenol by means of acidic catalysts and refers in particular to the separation and recovery of phenol and other reaction products from the reaction mixture. By the expression isopropylbenzene peroxides in this specification the hydroperoxide as well as the peroxide of isopropylbenzene are to be understood.

In the process of decomposing isopropylbenzene peroxides by means of acidic catalysts, which are, for instance, aqueous mineral acids, strong organic acids such as sulfonic acids, hydrogen ion exchange materials and acid treated activated earths, not only phenol and acetone are formed but it has been found that considerable quantities of other compounds such as $\alpha$-methylstyrene and also cumylphenol are produced. The recovery of these byproducts, therefore, is important as it contributes considerably to the economic success of the process. $\alpha$-Methylstyrene can be used for the production of polymethylstyrenes or it may be reconverted into isopropylbenzene by suitable hydrogenation and then be recycled to the oxidation process to produce further quantities of isopropylbenzene peroxides and ultimately again phenol therefrom. This hydrogenation is the more economical the higher the concentration of the $\alpha$-methylstyrene in the fraction which is to be subjected to said hydrogenation. The cumylphenol on the other hand is itself a valuable product or it may be decomposed in order to furnish additional amounts of phenol. The cumylphenol is found in the residue which remains after all the products with lower boiling points have been removed from the decomposition reaction mixture.

The production of isopropylbenzene peroxides is most conveniently effected by oxidizing isopropylbenzene in the liquid phase at elevated temperatures by means of molecular oxygen. The best efficiencies in the oxidation reaction are obtained when only a part of the isopropylbenzene is converted into the corresponding peroxides which consist mainly of the hydroperoxide, together with a small proportion of isopropylbenzene peroxide which is also formed. This oxidation reaction results, therefore, in a solution of the isopropylbenzene peroxides in unchanged isopropylbenzene and it is very economical for the manufacture of phenol to bring such a solution of the peroxides in isopropylbenzene into contact with acidic catalysts to effect the decomposition of the peroxides and produce phenol and acetone. In this case besides phenol, acetone, and cumylphenol, the decomposition reaction mixture contains unreacted isopropylbenzene and acetophenone.

The recovery from the decomposition reaction mixture of its various components and their concentration is advantageously effected by fractional distillation. When the whole decomposition product after it has been separated from the acidic catalyst is subjected to fractional distillation, the various compounds will distill over in the following sequence: acetone, isopropylbenzene if present in the reaction product, $\alpha$-methylstyrene, phenol, acetophenone and cumylphenol. It has been observed, however, that by fractional distillation very frequently the amounts of $\alpha$-methylstyrene obtained by this process were very small while the high boiling residues from the fractionation had increased simultaneously with an appreciable decrease in the phenol yield.

Now in accordance with the present invention it has been found that cumylphenol may be recovered from the residue remaining after an isopropylbenzene peroxide decomposition reaction mixture has been subjected to fractional distillation at a temperature below 200° C. to recover acetone, isopropylbenzene, $\alpha$-methylstyrene, phenol and acetophenone by subjecting said residue to extraction with alkali.

By way of explanation the formation of high boiling residues together with the decrease in the amount of $\alpha$-methylstyrene and phenol recovered has been found due to the presence of acids in the decomposition product to be distilled, and it is desirable for a high recovery of $\alpha$-methylstyrene to carry out the distillation and its separation from the other components of the reaction mixture under nonacid conditions by which in this specification it is meant that the pH value of an aqueous extract of the mixture to be fractionally distilled should not be less than 5. The determination of the pH value may be carried out with a glass electrode system.

When the decomposition is carried out with a solution of isopropylbenzene peroxides in unchanged isopropylbenzene and the acidic catalyst used consists of an aqueous acid such as sulfuric acid the decomposition product separates on standing into two layers. The top layer has an oily nature and contains as main constituents the products of the acid catalyzed decomposition dissolved in unchanged isopropylbenzene. After separation from the acidic catalyst, for instance, by decantation from the aqueous acid layer, the decomposition product also contains mechanically adhering traces of the acidic catalyst by which the decomposition has been effected. This acidic catalyst may effectively be removed from the decomposition mixture by washing with a small quantity of water. The wash water then contains about 2% of phenol and about 3% of acetone which may be subsequently recovered. There are also present in the decomposer product, however, organic acids which are soluble in the oil phase, such as formic acid, which have a deleterious effect in the subsequent distillation operations. These organic acids which are soluble in isopropylbenzene are in the main produced in the oxidation step preceding the decomposition. Hitherto they have been substantially neutralized by the addition to the isopropylbenzene of alkali, which addition was found to be advantageous during the oxidation reaction. The alkali metal salts of the organic acids pass out in the form of a suspension from the oxidation reactor into the decomposer where on contact with the acidic catalyst used, especially if this catalyst is an aqueous mineral acid, the free organic acids are regenerated therefrom. These free acids cannot be completely removed from their solution in the said mixture except by the use of large amounts of water which, however, will dissolve also phenol and acetone and necessitate the recovery of these substances from the wash waters.

By employing a comparatively small proportion of a dilute aqueous alkali such as sodium carbonate as the washing agent, complete removal of these acids which are deleterious to subsequent distillation operations is achieved. The amounts of aqueous alkali solution used for this purpose should be adjusted in such a way that they should be sufficient to react with any free acid to give the corresponding water soluble alkali salts but insufficient to dissolve substantial amounts of phenol.

Since the said acids or their alkali metal salts are already present when the oxidation product is brought into contact with the acidic catalyst, the said acids and salts may be removed substantially completely before the oxidation reaction product is brought into contact with the decomposing acidic catalysts by submitting the product issuing from the oxidizer to an alkali wash. This has the special advantage that no phenol or acetone is present before the decomposition takes place and therefore they cannot be taken up by the alkaline wash water. Consequently, the recovery of these compounds from the wash water is not necessary and the amount of acid to be removed by washing of the decomposer product is minimized.

The treatment of the decomposition product with an alkaline medium in order to remove therefrom any acidity is carried out until the pH value of an extract with distilled water is not less than 5, as stated above. The mixture is then fractionated and it is preferred to carry out the distillation under diminished pressure so that the kettle temperature does not exceed 200° C. since in this way the thermal decomposition of cumylphenol is minimized. After distilling off α-methylstyrene phenol is recovered as the next fraction.

After the removal of α-methylstyrene and phenol the residue contains acetophenone and cumylphenol. This last valuable phenolic compound in the residue may be treated according to the process described in U. S. 2,715,145, issued August 9, 1955, in order to increase the overall yield of phenol. However, according to the present invention the cumylphenol is isolated from said residue.

This isolation may be effected by fractionating the residue under reduced pressure while keeping the temperature in the kettles of the stills low, preferably below 200° C. in order to avoid decomposition of the cumylphenol. Another method of recovering the cumylphenol from the high boiling residue is by extraction with alkali. When the separation of cumylphenol is effected by distillation the decomposition of the cumylphenol is considerably reduced if the high boiling residue is first flash distilled and the resulting vapors are condensed and subsequently refractionated under reduced pressure. A further modification of these methods comprises subjecting the high boiling residue first to fractional steam distillation, by which any residual phenol and acetophenone are removed before fractionating or extracting with alkali the cumylphenol since in this way a pure product is obtained. The method of isolating the cumylphenol from the high boiling residue by fractional distillation under reduced pressure is claimed in our copending application Serial No. 165,102, filed May 29, 1950.

The method of isolating the cumylphenol from the high boiling residue in accordance with the present invention is that involving extraction of said residue with alkali, the term "alkali" being used in the usual sense of defining the hydroxides of sodium and potassium. The alkali is used in the form of an aqueous solution thereof, and the concentration of the alkali in said solution does not exceed 5%. Practical concentrations are between 1% and 5%, and preferred concentrations are between 1% and 2%. The residue containing the cumylphenol may be dissolved in a suitable water-immiscible organic solvent such as ether, benzene or carbon tetrachloride prior to being extracted with the aqueous alkali solution. Particularly when the extraction is carried out on a residue which has not been dissolved in a solvent, it is desirable to effect the extraction at a moderately elevated temperature, for example 40–65° C.

The extraction may be done in several stages if desired and the alkali extracts combined. To liberate cumylphenol from the alkali extract the latter is neutralized preferably with a strong inorganic acid such as sulfuric acid, although the acidification also may be accomplished through use, for example, of carbon dioxide. The liberated cumylphenol may then be distilled under reduced pressure and at temperatures below 200° C. to recover pure cumylphenol.

The following example illustrates the manner in which the process of the invention is carried out in practice.

*Example*

Isopropylbenzene was oxidized at a temperature of 130° C. to produce an oxidate containing about 25% isopropylbenzene hydroperoxide. The hydroperoxide was decomposed by contacting with concentrated sulfuric acid, after which the product was neutralized with aqueous 5% sodium carbonate. The neutralized product then was fed into a continuous still in which acetone, together with small amounts of isopropylbenzene and light boiling material, was removed at normal pressure. The liquid leaving the bottom of the stripping still was fed to a second continuous still in which the major part of isopropylbenzene, together with small amounts of α-methylstyrene and phenol, was distilled off. This last still was operated at 100 mm. pressure, the temperature in the kettle not exceeding 120° C. The liquid leaving the still was transferred to a batch still operated under reduced pressure and at temperatures below 160° C. The first two fractions collected contained isopropylbenzene, α-methylstyrene and some phenol. The third fraction was almost pure phenol, and the final fraction was a mixture of phenol and acetophenone.

The residue remaining in the still kettle and amounting to 55.5 pounds was flash distilled at 5 mm., the head temperature being 160° C. The distillate (53.0 lbs.) contained 23.1 pounds of cumylphenol and was extracted at 50° C. with 134.0 pounds of aqueous 5% sodium hydroxide solution. After separation of the aqueous and oily phases, analysis of the latter showed that 4.04 pounds of cumylphenol remained unextracted, consequently the oil phase was extracted with 15.0 pounds of 5% sodium hydroxide solution. The aqueous phases from the two extractions were combined and amounted to 175.0 pounds. The combined extract was acidified with sulfuric acid, resulting in the formation of an oil phase amounting to 30.5 pounds. Fractionation of the oil was carried out under 2–4 mm. pressure and at temperatures below 200° C. to recover 21.4 pounds of cumylphenol of melting point 70–72° C. After recrystallisation from hexane the cumylphenol had a melting point of 73° C. The yield of cumylphenol was 38.6% based on the weight of the original residue, but was 92.6% based on the amount of cumylphenol in the residue originally. The fraction containing the pure cumylphenol boiled at 150–151° C. at 2 mm.

This application constitutes a continuation-in-part of our application for Letters Patent Serial No. 165,102, filed May 29, 1950.

What we claim and desire to protect by Letters Patent is:

In the process for the manufacture of phenol wherein isopropylbenzene is oxidized in liquid phase at elevated temperatures with molecular oxygen to an oxidate containing isopropylbenzene peroxides, and said peroxides are decomposed by means of acidic catalysts to give a reaction mixture containing acetone, isopropylbenzene, α-methylstyrene, phenol, acetophenone, and cumylphenol, and said reaction mixture is subjected to fractional distillation at a temperature below 200° C. to recover acetone, isopropylbenzene, α-methylstyrene, phenol, and acetophenone, leaving a residue containing cumylphenol, the improvement which comprises the step of subjecting said residue to extraction with alkali to recover cumylphenol.

No references cited.